G. W. & E. F. GOODYEAR.
M. & C. W. GOODYEAR & J. FAULKNER, EXECUTORS OF G. W. GOODYEAR, DEC'D.
ROAD WHEEL OF AUTOMOBILES AND THE LIKE.
APPLICATION FILED NOV. 17, 1911.
1,105,646.   Patented Aug. 4, 1914.
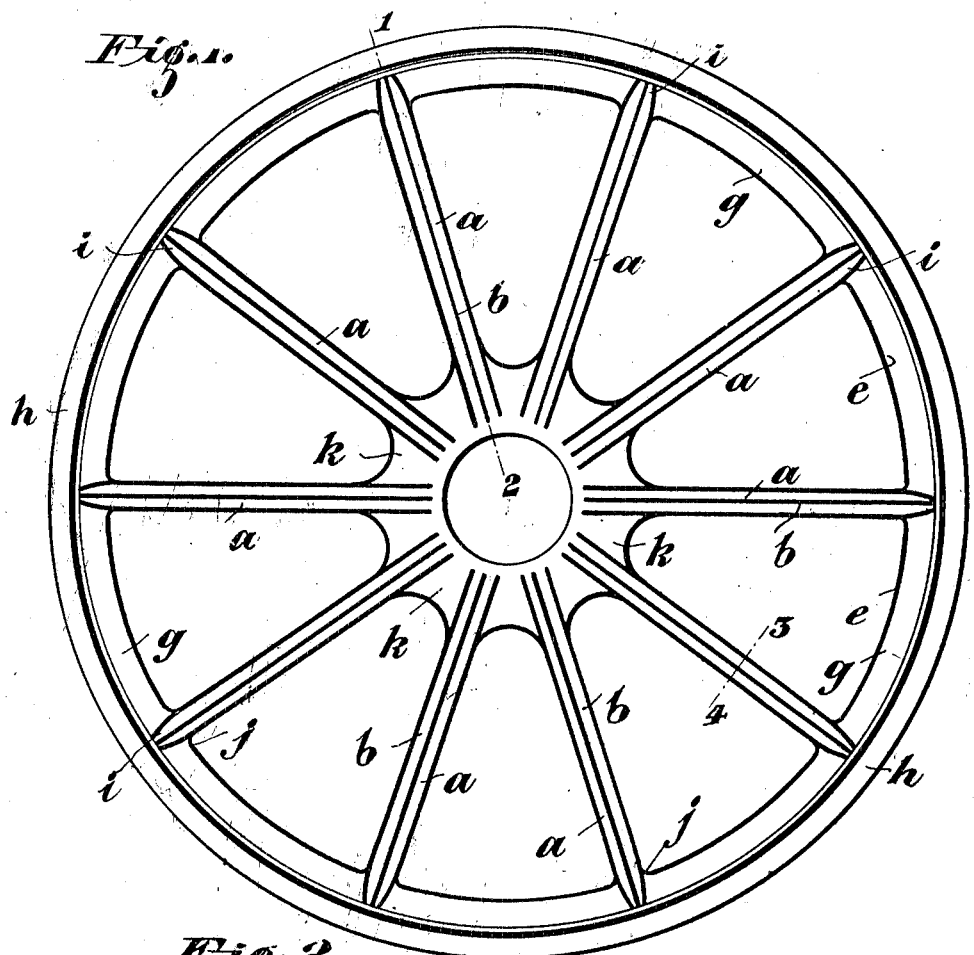
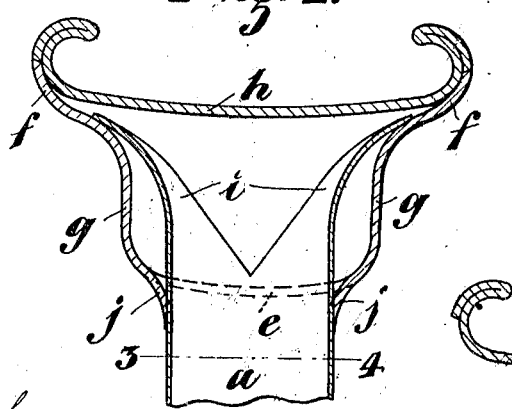
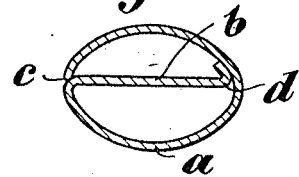
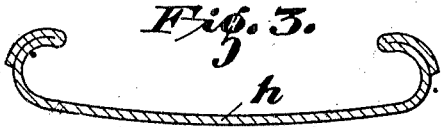

UNITED STATES PATENT OFFICE.

GEORGE W. GOODYEAR AND ERNEST F. GOODYEAR, OF DUDLEY, ENGLAND; MARIA GOODYEAR, CHARLES WILLIAM GOODYEAR, AND JOSEPH FAULKNER EXECUTORS OF SAID GEORGE W. GOODYEAR, DECEASED.

ROAD-WHEEL OF AUTOMOBILES AND THE LIKE.

1,105,646.  Specification of Letters Patent.  Patented Aug. 4, 1914.

Application filed November 17, 1911. Serial No. 660,905.

*To all whom it may concern:*

Be it known that we, GEORGE WILLIAM GOODYEAR and ERNEST FREDERICK GOODYEAR, subjects of the Kingdom of Great Britain, residing at Reliance Works, Dudley, in the county of Worcester, England, manufacturers, have invented certain new and useful Improvements in Road-Wheels of Automobiles and the like, of which the following is a specification.

This invention comprises certain improvements in or relating to wheels such as the road wheels of automobiles and the like, and more particularly to such of these wheels as are composed of steel or equivalent material, the object of the present invention being to so construct or manufacture the wheel and to enable it to more satisfactorily avoid lateral strain, as also to enable the wheel to resemble one made of wood, while furthermore the improved wheel is stronger and generally of better and more satisfactory construction than those existing heretofore, having regard to both utility and cost in manufacture.

In order that this invention may be clearly understood and more readily carried into practice, reference may be had to the appended explanatory sheet of drawings, upon which:—

Figure 1 is a sectional elevation of a wheel suitable as the road wheel of an automobile and constructed in accordance with the present invention. Fig. 2 is an enlarged transverse section on line 1, 2, of Fig. 1. Fig. 3 is a section showing separately the rim indicated by reference $h$ shown in Fig. 2. Fig. 4 is a transverse section on line 3, 4, of Figs. 1 and 2.

According to this invention the spokes of the wheel are each composed of a metallic tube $a$ shown particularly at Fig. 4, having a central internal web $b$ which is integral with the metal of the tube and which divides the latter throughout substantially its entire length into two halves, the web being disposed in a plane transversely of the plane of the wheel to thereby prevent lateral bending or distortion of the spoke. In order to provide the internal web integral with the metal of the tubular spoke, the latter is composed of a seamed tube jointed at $c$ the sheet metal of the tube being at one edge bent at a right angle at which angle it extends across the internal space of the tube in the form of the web $b$ until it butts against the other side thereof. At the position at which such extremity of the internal web butts against the inner surface of the tube, said web may be welded, brazed or otherwise secured or it may be loose while the joint $c$ which is shown as a butt joint but which may in some cases be a lap joint, is welded, brazed or otherwise suitably secured by which means the web is satisfactorily retained in its desired position. If desired the edge of the web farthest removed from the lap joint may be curled or rolled over at $d$ to form a larger surface by which it may be jointed to the inner surface of the tube $a$. The welding or brazing of this joint may be effected after the tube and web have been formed to the desired configuration or the joint may be effected at an intermediate stage in the manufacture of the combined tube and web. The outer extremities of the spokes are secured to a rim $e$ of channel section adapted externally to resemble the felly of a wooden wheel and said rim of channel section has at the outermost edges of its two flanges, lips or rings $f$ diverging away from each other as shown in Fig. 2 or at an angle of about 45° to the flanges $g$ upon which they are formed. In between the inclined lips $f$ is disposed a standard section rim $h$ adapted to receive and carry a pneumatic tire. Said standard section pneumatic rim is conveniently of the form shown in Fig. 3 and is split or divided at one point in its circumference to permit of its being sprung over one of the lips $f$ upon the channel rim $e$ and after being placed in position its joint is welded, brazed or otherwise secured, in addition to which the rim may be jointed at each side to the inclined lips $f$ throughout the entire circumference of the wheel, the lips forming a lock by which the standard section pneumatic rim cannot be displaced after it has been jointed and fixed in its contracted condition.

At the outermost extremities of the spokes at which they are secured to the channel rim, conveniently before the pneumatic rim is secured thereon, each spoke is divided in the form of two tongues *i* which are projected through a hole in the channel rim after which the tongues are secured to the side flanges *g* of the channel rim at their inner surface. The whole is brazed, welded or otherwise suitably secured and if desired the tongues *i* may be riveted to the side flanges *g* of the channel rim *e*. The holes in the base of the channel rim *e* through which the tongues *i* project, may in the process of formation be surrounded with metal *j* which is curved inwardly in a direction toward the center of the wheel and which metal forms a collar surrounding the tube spoke by which the latter may be more effectively secured, welded or brazed in connection with the rim *e*. The tongues *i* may be tapered or pointed or they may be square at their outermost extremities formed by dividing the tube for a short distance and opening out the halves. As an alternative to this arrangement however, a boss may be provided upon the base of the channel rim, within the latter, said boss being adapted to receive the end of the tube which latter is secured by welding, brazing or the like within the boss, the boss being in similar manner secured or welded within the channel and if desired being furnished with lugs, extensions or the like by which it is riveted to more effectively retain it in position within the rim. Or a similar boss may be provided upon the face of the channel rim nearest the center of the wheel to receive the extremity of the tube spoke and secure the latter to the rim. Or a male boss may be provided upon the surface of the channel base nearest the center of the wheel, said male boss being adapted to project into the extremity of the tube spoke thereby retaining the latter in the desired connection.

Such a construction as afore described may be provided upon either a cast or a pressed hub. In the former case the inner extremities of the spokes may project into blind holes within the periphery of the hub, the latter being cored or suitably formed for lightness. Or a metal boss may be provided upon the hub to project within the innermost extremity of each tube spoke so retaining the latter in position. Where a pressed hub is employed it may be formed in two halves *k* each being corrugated around their edges or otherwise pressed to a form, which, upon the two halves of the hub being brought together, provides a series of perforations for the reception of the spokes which latter project into the interior of the hub and may butt against same. A concentric sleeve or collar may be provided to which the spokes may be welded, brazed or otherwise suitably secured. In addition to or instead of the sleeve aforesaid, suitable anchorage is provided to centrally support or secure the spokes in a rigid and efficient manner suited to withstand the stress and lateral pressure to which they are subjected. Or the halves of the hub may together form a series of hollow bosses which project into the inner extremities of the tube spokes and so retain the latter in position. By suitably providing shoulders upon the bosses last mentioned, a flush joint may be provided between the spokes and the hub together.

The sides or halves of the hub may be bolted together in any suitable manner, and to prevent the parts of the hub sections from being constrained in toward each other, compression tubes or equivalent members are provided conveniently surrounding the tension bolts.

By the employment of the integral laterally disposed web within the spoke and by suitably securing the spoke to the rim as also to the hub, a particularly high degree of lateral strength is attained rendering the wheel particularly well adapted for use as the road wheel of an automobile.

What we claim as our invention and desire to secure by Letters Patent is:—

1. A hollow wheel spoke comprising an elongated tubular body formed of a sheet of metal having one longitudinal portion extending transversely across the hollow interior with the side edge secured to the interior of the spoke body, the other side edge being secured to the body at a point opposite the first named side edge, substantially as described.

2. A hollow wheel spoke comprising an elongated tubular body formed of a sheet of metal having one longitudinal portion extending across the hollow interior of the body and into engagement therewith, the other side edge being secured to the body at a point opposite said first named side edge, substantially as described.

3. A hollow wheel spoke comprising an elongated tubular body formed of one sheet of light metal and having one portion extending transversely across said body, substantially as described.

4. A hollow wheel spoke comprising an elongated body formed of one sheet of light metal and having one portion extending transversely across said hollow body, said transverse portion extending substantially throughout the length of said body, substantially as described.

5. A hollow wheel spoke comprising an elongated tubular one piece body of oval cross section and having an integral transverse portion disposed coincident with the major oval axis of said body, substantially as described.

6. A hollow wheel spoke comprising an elongated tubular one piece body of oval cross section and having an integral transverse portion disposed coincident with the major oval axis of said body, the end of the spoke being bifurcated transversely of such axis, substantially as described.

In witness whereof we have hereunto set our hands in the presence of two witnesses.

G. W. GOODYEAR.
E. F. GOODYEAR.

Witnesses:
HOLLIS F. BROWN.
ARTHUR H. BROWN,